Dec. 13, 1955    S. J. ZAND ET AL    2,726,671
MODULATED TANK CONTROL
Filed Aug. 18, 1954    2 Sheets-Sheet 2
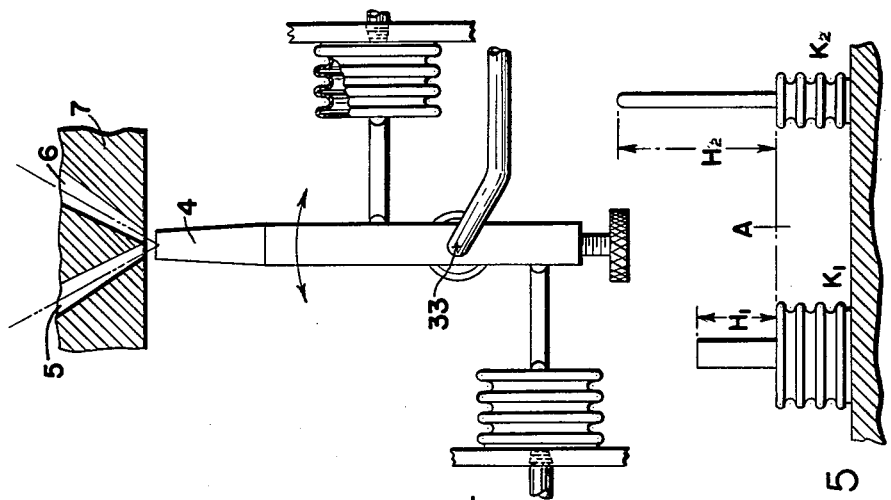
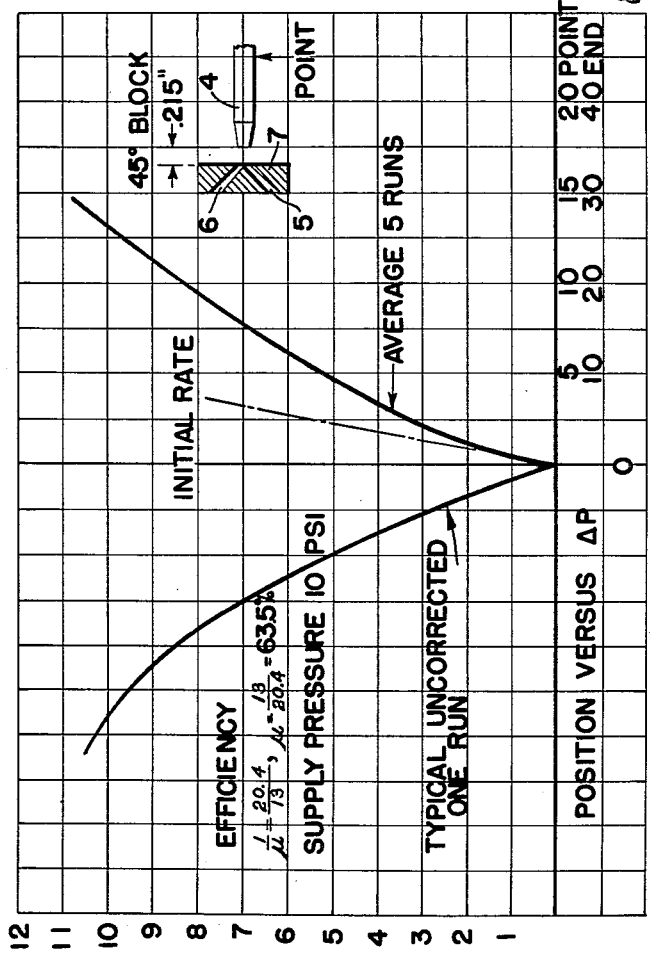
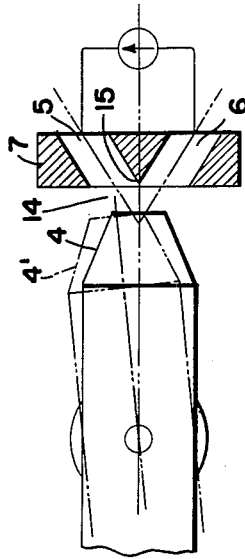
INVENTORS
STEPHEN J. ZAND
ROBERT E. FORRESTER
BY
*Frank H. Harmon*
ATTORNEY United States Patent Office 2,726,671
Patented Dec. 13, 1955

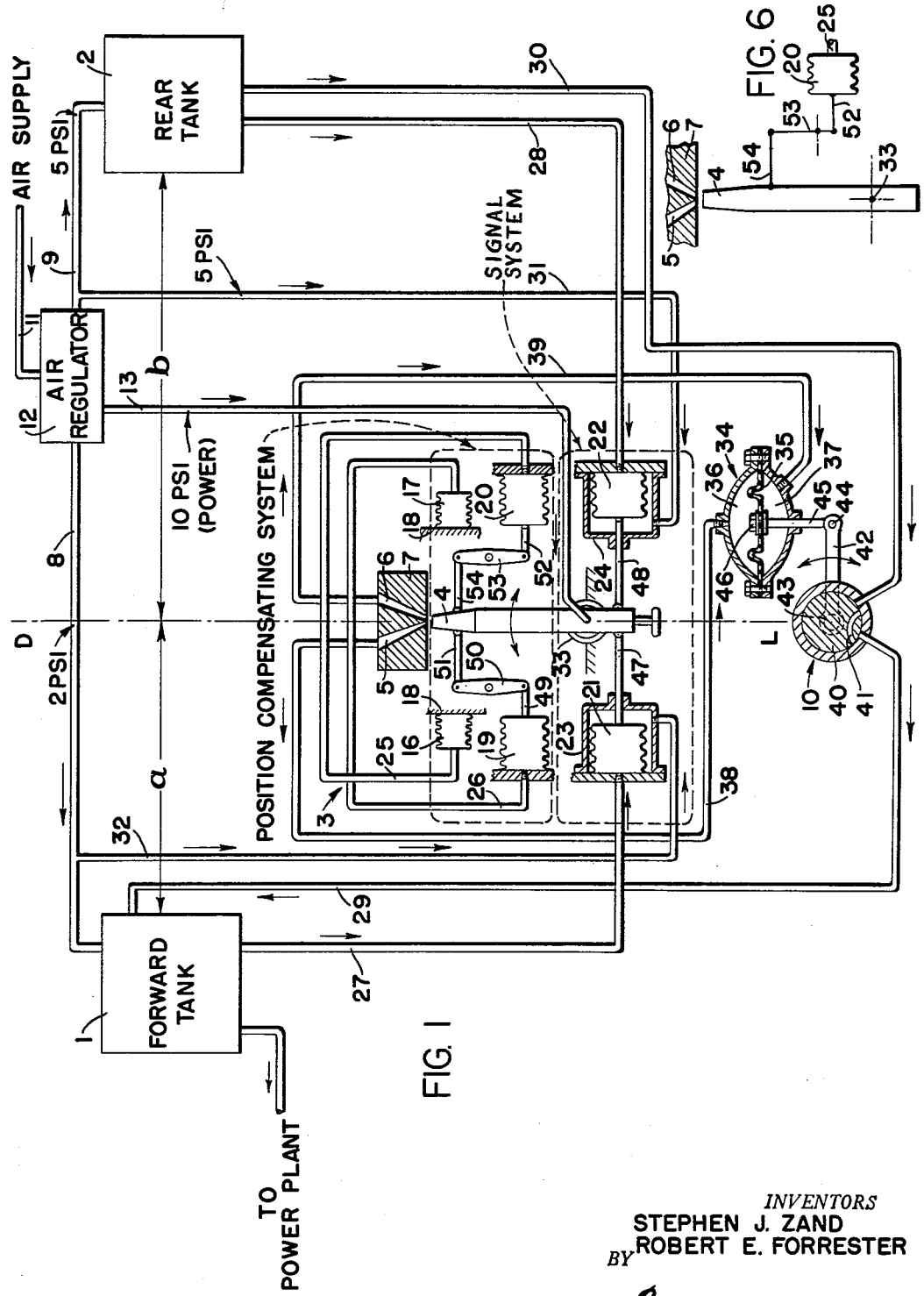

2,726,671

MODULATED TANK CONTROL

Stephen J. Zand, Erie, and Robert E. Forrester, Corry, Pa., assignors to Aero Supply Manufacturing Company, Inc., a corporation of New York Application August 18, 1954, Serial No. 450,755

8 Claims. (Cl. 137—98)

This invention relates in general to liquid transfer systems and more particularly to control devices for maintaining an equal or predetermined liquid level among a plurality of communicating liquid containing vessels.

The invention has particular applicability in aircraft fuel tanks where, for instance, a forward tank is located at a given distance forward of a plane containing the center of gravity of the aircraft and the rear tank is located at a predetermined different distance rearward of this plane. Variation in the relative liquid fuel column in the two tanks creates an undesirable shift of the center of gravity of the aircraft.

It is therefore a specific object of the invention in this environment to provide means for automatically and continuously transferring an amount of liquid fuel from the rear tank to the forward tank, or vice versa, depending on the configuration so as to reduce the center of gravity shift of the aircraft to a specified minimum.

Inclusive, or exclusive, of this particular aircraft environment, the various objects of the invention include, in a liquid transfer system between a plurality of communicating compartments, means for automatically maintaining a predetermined and equal liquid level among the compartments and a power operated valving system, energized by means of a jet pipe relay amplifier, that provides for liquid transfer between the compartments, the amplifier being automatically responsive to pressure differences resulting from variations in liquid columns among the compartments.

It is a further object to provide such an amplifier that will automatically correct for relative inclinations to the horizontal by employing pendulae filled with liquid of greater specific gravity than that of the liquid fuel in the compartments that will act by means of resilient pressure responsive means and compound leverage systems on the jet pipe relay to bias the latter in such a manner as to remove the gravity component due to inclination so as to make the system responsive only to the height of the liquid fuel column.

Briefly, such a system, as contemplated by this invention, includes a device that is sensitive to the amounts of liquid fuel in the respective compartments; a valving system providing for liquid flow from one compartment to another and a power source to operate the jet relay and the valving system so as to close such liquid flow when liquid height balance is acquired and an automatic compensating system for eliminating the effect of gravity due to inclination in a plane at any angle to the true horizontal.

With the foregoing and other objects in view, the invention resides in the combination of parts and in the details of construction hereinafter set forth in the following specification and appended claims, certain embodiments thereof being illustrated in the accompanying drawings, in which:

Figure 1 is a diagrammatical illustration of the liquid level control system in connection with two liquid containing tanks and the relative positions of the moving parts of the control system when balance of fuel column height in the two tanks is present;

Figure 2 is a graph showing curves delineating the operation of the control system:

Figure 3 is a detail illustration of the jet amplifier and its bellows connections, involving a modification of the invention;

Figure 4 is a detail view in longitudinal section taken through the jet amplifier;

Figure 5 is a detail view of the bellows and linkage responsive to liquid column deflection; and Figure 6 is a schematic illustration of the jet relay amplifier and compound leverage.

Referring more particularly to Figure 1 of the drawings, we have diagrammatically illustrated, as an environment for our invention, an aircraft fuel system using a forward tank 1 and a rear tank 2 communicating therewith through a position compensating system, generally indicated at 3, and including a pivotally mounted jet nozzle 4, shown in Figure 1 in normal neutral position with respect to outwardly tapered holes 5 and 6 in the jet block 7 designate, as a datum line D—L, a line taken through the normally vertical longitudinal axis of the jet nozzle. The forward tank 1 is placed relatively closer to datum line than the rear tank. As a matter of illustration, the forward tank 1 may be considered as positioned "$a$" inches forward of the datum line and the rear tank "$b$" inches rearwardly of the datum line.

Variation in the amount of fuel in tanks 1 and 2 produces a shift of the center of gravity of the airplane. We therefore propose to transfer, preferably continuously and automatically, an amount of fuel from the rear tank to the forward one in order to maintain the shift of center of gravity of the aircraft to a prescribed value.

In order to accomplish the proper transfer of fuel from one tank to another, we propose to provide a device that will be sensitive to the amounts of fuel in the respective tanks, a valving system permitting the flow of fuel from one tank to another that will automatically close when fuel column balance is reached, a source of power to operate the valving system and a compensating system that will eliminate the effect of gravity on the tanks when the aircraft is in a climb or dive attitude.

Disregarding, momentarily, the effect of gravity in the above described maneuvering attitudes, the tanks are equipped with appropriate pipe connectors to bring the fuel to a station coincident with the datum line D—L where a device is located which measures in separate units the net fuel pressure, namely, the fuel column minus the eventual supercharging of a pressure of "A" pounds per square inch in line 8 in a forward direction and pressure of "B" pounds per square inch in line leading to the rear. The differential signal operates a non-electric relay amplifier system, which in turn causes a fuel valve 10 to move to open or closed position, as dictated by the differential pressure. The source of power may be pressure air from a supply source through a line 11 through an air regulator 12 through a line 13 at a pressure of "C" pounds per square inch.

Our control device preferably employs a jet pipe system, as an amplifier, and includes a jet nozzle pipe 4, pivotally mounted to be moved clockwise, or counterclockwise, in the two directtions denoted by the two arrows. The open end of nozzle 4 faces a jet block 7. The distance 14 is preferably kept small of the order of 0.05 to 0.25 inch, the jet diameter should be kept small, and of the order of 0.05 to 0.130 inch. The jet block 7 is shown as a prismatic piece of material into which two holes 5 and 6 are drilled at an angle so that their centerlines intersect and the holes are tangent to each other.

Practically a feather edge 15 exists at the point of tangency of passages 5 and 6. The plane containing these passages 5 and 6 is inclined to the plane in which the jet pipe can oscillate. The angle is preferably of the order of 10° to 40° and its exact value is of some importance as it has a bearing on the efficiency with which the transfer of the impact pressure takes place.

Referring to Figure 4, it will be seen that when the jet nozzle 4 is in the position shown in dotted lines at 4', no pressure will be found in passage 5 of the jet block 7 and that a proportionately greater supply pressure will be present in passage 6. The opposite is the case in the other extreme. Between these two cases, a zero, or neutral, point will be found when the jet nozzle assumes the position shown in full lines at 4, which theoretically is the point corresponding to the time when the center plane of the two passages 5 and 6 intersects the jet pipe, which is perpendicular to the feather edge 15 of the block 7. Between those extremes lies a smooth relation between the jet pipe's angular position and differential pressure. Near the zero point the relation is almost linear changing into approximately a parabolic one at larger departures from neutral. The shape of the curve is, of course, symmetrical. The important feature of the differential pressure curve is, that the rate of change of differential pressure is greatest around the null point. The sensitivity of the device is astonishingly high. The graph in Figure 3 illustrates the performance of an actual model where for 1/1000 inch displacement of the tip of the jet nozzle 4, a pressure of ten pounds per square inch of about one-half of mercury exists. The efficiency of the model is $$\frac{\text{output (Maximum)}}{\text{input}}$$

equal 63%, which is sufficient for the purpose intended, but it may be increased, if necessary, to 80% by controlling certain dimensions and change in detail design.

With respect to the application of the jet nozzle to the problem of fuel flow modulation, reference is made to Figure 1. The system includes a pair of identical flexible bellows 16 and 17, secured to a stationary frame 18. It also includes a pair of identical bellows 19 and 20 and a pair of identical bellows 21 and 22 positioned respectively in housings 23 and 24. Bellows 16 and 20 are in communication with each other through a pipe 25 and bellows 17 and 19 by means of pipe 26. Fuel from the forward tank 1 flows through pipe 27 into bellows 21 and fuel from the rear tank 2 flows through pipe 28 into bellows 22. The other pipes 29 and 30 lead from tanks 1 and 2 to the common fuel valve 10. Bellows 16, 17, 19 and 20 and housings 23 and 24 contain liquid that is heavier than the tank fuels and bellows 21 and 22 contain tank fuel.

Through the air regulator 12, pressure air at "B" pounds per square inch is delivered through pipe 31 into housing 24, but externally of bellows 22. Pressure air at "A" pounds per square inch is delivered through pipe 32 into housing 23, but externally of bellows 21. The hollow nozzle is mounted at 33 for clockwise and counterclockwise oscillation in the plane designated by the arrows. Pressure air at "C" pounds per square inch is delivered through pipe 13 into the jet nozzle 4. An air relay 34 includes a two-part housing divided normally in half by a flexible diaphragm 35 into two chambers 36 and 37. From chambers 36 and 37 pipes 38 and 39 lead to points respectively adjacent the outlets of passages 5 and 6 in the jet block 7. The valve 10 includes, for example, a casing in which is rotatably mounted a valve plug 40 with an arcuate passage 41 therein. Link 42 of a bell crank is connected at 43 to plug 40. The other end of link 42 is pivotally connected at 44 to a link 45 that is connected at 46 to diaphragm 35. Rods 47 and 48 have one end each pivotally connected to the jet pipe 4, at a point below its pivot 33, and their other end each respectively connected to bellows 21 and 22 to extend slidably through housings 23 and 24. The free end of bellows 19 has connected thereto a compound linkage including a link 49 pivotally connected to a pivoted bar 50, to the other end of which is pivotally connected a link 51 that is pivotally connected to jet pipe 4 at a point above its pivot point 33. In opposition, the free end of bellows 20 has connected thereto a compound linkage including a link 52 pivotally connected to a pivoted bar 53, to the other end of which is pivotally connected a link 54 that is likewise pivotally connected to jet pipe 4 at a point above its pivot point 33.

The deflection of bellows 21 is proportional to the fuel column in the forward tank 1 and the deflection in bellows 22 is a measure of the fuel column in the rear tank 2. When the two fuel columns are equal, or set to a predetermined differential, the amplifier 36 is set to zero, which means that the pressure in pipes 38 and 39 are equal and no motion takes place at the load end, rotary valve 10. If the fuel column changes in either tank so that their difference is not the one to which the apparatus originally was set, the differential pressure moves the jet pipe to the left, or to the right, and a force is available at the valve 10 to open or close the passage of fuel between the tanks. This force disappears when equilibrium is established. The sensitivity of the bellows may be increased by the ratio of the lever arms connecting the bellows to the jet pipe pivot to length of jet pipe. Either the net fuel column, namely the column of fuel, minus tank supercharging, or the total pressure difference may be made the signal value. In the present case, the net fuel pressure difference is used.

In summary, the problem of fuel flow modulation contains two basic parameters, namely, modulation itself, and also the compensation of the effect of gravity caused by the universal spacial freedom of the airplane. As shown in Figure 1, the bellows 21 and 22 are to be considered as signal receiving devices subject to automatic and continuous contraction and expansion in function of the fuel head by means of the connecting rods 47 and 48 that move the jet pipe 4 angularly in such a manner that the pressure in pipe 13 impinging on the opening in the jet pipe block 5 and 7 represents indirectly but accurately and continuously the height of the fuel in tank 1 or 2.

If and when the airplane climbs or dives, the weight of fuel in line 27 and line 28 would bias the jet pipe in proportion to the angle of inclination so as to produce an erroneous indication. The bellows 19 and 20 filled with liquid and its transmission system attaching in opposite directions have been devised by us in such a manner that they produce on the jet pipe an opposing force which cancels this effect.

The sensitivity of the apparatus is limited only by the deflection characteristics of the bellows. The larger the deflection percent of weight, the more sensitive the whole control system will be. Using commercially available bellows, our calculations show that the thus obtained theoretical sensitivity of the system can be made to reach a value of about ⅛ inch of fuel, and by refinements of the design technique this value can be brought to ½ inch. Since most aeroplane specifications call for one inch sensitivity, a large leeway is available for making the apparatus only moderately critical to considerations such as tolerances, assembly techniques and the like.

In a dive or climb of the aircraft, the pressure which the bellows measure is not directly proportional to the quantity of fuel and it depends on the instantaneous value of the dive or climb angle. Relatively small angles will affect the exactness of the system. The simplest solution would be to provide two separate independent standpipes of the same length as the lines to the signal bellows and provide a signal sensitive to a given angle and adding it algebraically to the fuel head signal, thereby continuously and automatically forcing the jet pipe to be responsive only to the fuel column. If filled with fuel, the standpipe would be "$a$" inches and "$b$" inches long, making the apparatus somewhat clumsy and vulnerable. However, the length of the standpipe can be materially reduced by the following expedients. It is important to note at this point that nothing is of interest here except the displacement of the jet pipe tip under the apparent weight of the inclined fuel column. If, in lieu of fuel, a liquid is used of greater specific gravity, the length of the pipe can be shortened. By choosing an inert organic fluid of proper overall characteristics and of a specific gravity of "gamma," the length diminishes to respectively "$a$" + "gamma" inches and "$b$" + "gamma" inches. Impinging this pressure on a bellows of larger diameter than the signal bellows and transmitting its deflection via a compound leverage system 49, 50 and 51 and 52, 53 and 54, the effect of standpipe length under aircraft dive and climb conditions can be compensated within the amplifier itself thereby fulfilling the desideratum of small and compact size. To take care of the displacement of fluid, due to temperature or during level flight, an expansion bellows of suitable deflection characteristic is provided connected permanently by means of silver soldered piping with the compensating bellows.

While inverted flight is not a routine maneuver of an aircraft, it can happen under unusual conditions. If the maneuver is performed with rapidity, chances of the line carrying the five and two pounds per square inch air pressure becoming filled with fuel are remote. However, in the interest of anticipating a possible combination of events which would permit the air lines becoming filled, valves can be provided in the air lines shutting off the fuel at a specified angular departure of the airplane from the horizontal. If for some reason a cut off valve should not be desired the air line connector to the tank could be made like a block with a multiplicity of tubes of small diameters in the order of .03 inch. Then, because of capillary forces and surface tension phenomena, the air has free passage but fuel will not enter the lines. The inverted flight problem does not present unusual difficulties. This discussion covers one special condition in which the fuel column of the rear tank is kept substantially equal to the head of the forward tank. It is feasible to introduce bias forces, acting on the jet pipe, which will alter the relationship of forward and rear tank heads according to a predetermined schedule. The bias forces so introduced are a function of tank geometry, desired center of gravity position and weight of fuel as related to changing fuel heads.

Knowing the ratio and the sensitivity of the bellows, one can calculate the deflection of the bellows and establish by routine arithmetic the diameter and the number of convolutions and other pertinent data.

As seen from the general description the position error is a function of the cosine of the inclination angle. It can be eliminated by several expedients all of which because of the basic nature of the problem must be based on pendular devices sensitive to the apparent gravity. The simplest expedient would be to provide two "standpipes" parallel and of the same length as the lines 27 and 28 of Figure 1, filled with fuel terminating in identical bellows 21 and 22, but acting on the opposite side of the jet pipe pivot 33. These pipes would not be connected with the tanks, hence the component generated during an inclined flight would balance the component of the feed line. Such a solution necessitates two extra standpipes of "$a$" inches and "$B$" inches length which, while functionally correct, is not appealing because of bulk weight and possible installation difficulties.

By using a different and heavier liquid, the length of the pipes can be shortened in the ratio of the specific gravities of one to two. The characteristics of this liquid should be a high specific gravity, "gamma," a freezing point below −65° F., a boiling point above 170° F., non-corrosive to braze and solder, commercially available at reasonable cost and not too toxic. The liquid which we consider preferable is chosen from organic high alcohols such as are encountered in the group of chloroethylenes and bromoethylenes. The "gamma" of this family varies between 1.3 to 1.5 and in temperature range from −90° C. to +97° C. It is to be noted that inasmuch as the system is solidly filled, the change of boiling point, due to change of atmospheric pressure, is of no consequence. Thus, if "$a$" and "$b$" are the length of the feed lines, then the length of the compensating lines will be as follows, with "$S$" representing the specific gravity of the liquid contained in the front and rear tanks:

$$\text{Rear tank} = \text{"}b\text{"} \times \text{"}S\text{"} = \text{"}d\text{"} \text{ inches}$$

$$\text{Front tank} = \text{"}a\text{"} \times \frac{\text{"gamma"} - \text{"}S\text{"}}{1.455 \text{ "gamma"}} = \text{"}e\text{"} \text{ inches}$$

While the introduction of the heavy liquid is a definite improvement, it is still an outside mechanism. The problem is reduced, therefore, to the provision of such a configuration that will give a jet deflection at the tip of the same amount, but opposite sign, as the one produced by the component due to gravity, as shown schematically in Figure 3. L is a function of the spring rate, or deflection, end of the ratio, or point of pressure transfer of the bellows, to its pivot to the jet pipe length. The gravity component is cancelled when: "$a$"×(specific deflection due to gravity) equals "$b$"×(specific deflection due to fuel flow). By choosing a proper value for the first term, the length of the "standpipe" can be very materially shortened. It is convenient to choose the compensating bellows in such a way that the specific deflection "$B$" is higher for the same value of H than that of the signal bellows, as illustrated in Figure 5.

We claim:

1. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, an amplifier relay for actuating said valve, separate air lines leading into said relay and communicating with passages in a jet block, a pressure air source and an air jet pipe with a nozzle normally disposed betwene the passages in said jet block to deliver pressure air to said relay to maintain said valve closed, lines leading from said vessels to opposed bellows connected to said jet pipe, said opposed bellows being located in housings containing relatively heavy liquid of greater specific gravity than that of the liquid in said vessels, a pair of opposed linkages connected to said jet pipe and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

2. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, a liquid pressure operated amplifier relay for actuating said valve, separate air lines leading into said relay communicating with passages in a jet block, a pressure air source and an air jet pipe with a nozzle normally disposed between the passages in said jet block to deliver pressure air to said relay to maintain said valve closed, lines leading from said vessels to opposed bellows connected to said jet pipe, said opposed bellows being located in housings containing relatively heavy liquid of greater specific gravity than that of the liquid in said vessels, a pair of opposed linkages pivotally connected to said jet pipe and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

3. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, an amplifier relay for actuating said valve, separate air lines leading into said relay and communicating with passages in a jet block, a pressure air source and a pivoted air jet pipe with a nozzle normally disposed between the passages in said jet block to deliver pressure air to said relay to maintain said valve closed, lines leading from said vessels to opposed bellows connected to said jet pipe on one side of its pivot point, said opposed bellows being located in housings containing relatively heavy liquid of greater specific gravity than that of the liquid in said vessels, a pair of opposed linkages pivotally connected to said jet pipe on the other side of its pivot point and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

4. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, an amplifier relay for actuating said valve, separate air lines leading into said relay and communicating with passages in a jet block, a pressure air source and a pivoted air jet pipe with a nozzle normally disposed between the passages in said jet block to deliver pressure air to said relay to maintain said valve closed, lines leading from said vessels to opposed bellows connected to said jet pipe below its pivot point, said opposed bellows being located in housings containing relatively heavy liquid of greater specific gravity than that of the liquid in said vessels, a pair of opposed linkages pivotally connected to said jet pipe above its pivot point and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

5. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, an amplifier relay for actuating said valve comprising a housing divided into two compartments by a diaphragm operatively connected to said valve, an air line leading into each of said compartments and communicating with passages in a jet block, a pressure air source and a pivoted air jet pipe with a nozzle normally disposed between the passages in said jet block to deliver equal pressure air to said relay compartments to maintain said valve closed, lines leading from said vessels to opposed bellows connected to said jet pipe on one side of its pivot point, said opposed bellows being located in housings containing relatively heavy liquid of greater specific gravity than that of the liquid in said vessels, a pair of opposed linkages pivotally connected to said jet pipe on the other side of its pivot point and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

6. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, a liquid pressure operated amplifier relay for actuating said valve, separate air lines leading into said relay and communicating with passages in a jet block, a pressure air source and an air jet pipe with a nozzle normally disposed between the passages in said jet block to deliver equal pressure air to said relay to maintain said valve closed, lines leading from said vessels to opposed bellows connected to said jet pipe, said opposed bellows being located in housings containing relatively heavy liquid of greater specific gravity than that of the liquid in said vessels, a pair of opposed linkages connected to said jet pipe and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said pressure means and said linkage system on said jet pipe to bias the same to convey pressure air to said amplifier relay to make said system responsive only to liquid height in the vessels.

7. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, a liquid pressure operated amplifier relay for actuating said valve comprising a housing divided into two compartments by a diaphragm operatively connected to said valve, an air line leading into each of said compartments and communicating with passages in a jet block, a pressure air source and a pivoted air jet pipe with a nozzle normally disposed between the passages in said jet block to deliver equal pressure air to said relay compartments to maintain said valve closed, lines leading from said vessels to opposed bellows connected to said jet pipe on one side of its pivot point, said opposed bellows being located in housings containing relatively heavy liquid of greater specific gravity than that of the liquid in said vessels, a pair of opposed linkages pivotally connected to said jet pipe on the other side of its pivot point, and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said resilient pressure means and said linkage system on said jet pipe to bias the same to convey pressure air to said amplifier relay to make said system responsive only to liquid height in the vessels.

8. In a liquid transfer system between a plurality of vessels, means for maintaining an equal liquid level in said vessels independently of gravity and acceleration components and withdrawal of liquid from either vessel, said means comprising a valve located in lines from said vessels for controlling and regulating liquid flow between the vessels, a liquid pressure operated amplifier relay for actuating said valve comprising a housing divided into two compartments by a diaphragm operatively connected to said valve, an air line leading into each of said compartments and communicating with passages in a jet block, a pressure air source and a pivoted air jet pipe with a nozzle normally disposed between the passages in said jet block to deliver equal pressure air to said relay compartments to maintain said valve closed, lines leading from said vessels to opposed bellows connected to said jet pipe below its pivot point, said opposed bellows being located in housings containing relatively heavy liquid of greater specific gravity than that of the liquid in said vessels, a pair of opposed linkages pivotally connected to said jet pipe above its pivot point and to opposed bellows filled with heavy liquid, a second pair of bellows containing heavy liquid, lines connecting each one of the opposed bellows to the opposite of said second bellows, said amplifier being operated by the pressure differences due to the variation of liquid columns of the respective bellows and corrected for errors by means of said bellows and housings filled with heavy liquid and acting by means of said resilient pressure means and said linkage system on said jet pipe to bias the same to convey pressure air to said amplifier relay to make said system responsive only to liquid height in the vessels.

References Cited in the file of this patent
UNITED STATES PATENTS

| | | |
|---|---|---|
| 2,169,982 | Von Manteuffel | Aug. 15, 1939 |
| 2,509,629 | De Giers et al. | May 30, 1950 |
| 2,585,480 | Makhonne | Feb. 12, 1952 |
| 2,621,719 | Eaton | Dec. 16, 1952 |
| 2,672,880 | Hermanson | Mar. 23, 1954 |
| 2,684,217 | Edwards | July 20, 1954 |